(12) United States Patent
Pasuri

(10) Patent No.: US 7,279,802 B2
(45) Date of Patent: Oct. 9, 2007

(54) METHOD IN A WIND POWER PLANT

(75) Inventor: Osmo Pasuri, Ojakkala (FI)

(73) Assignee: ABB Oy, Helsinki (FI)

( * ) Notice: Subject to any disclaimer, the term of this patent is extended or adjusted under 35 U.S.C. 154(b) by 109 days.

(21) Appl. No.: 11/194,706

(22) Filed: Aug. 2, 2005

(65) Prior Publication Data

US 2006/0033339 A1    Feb. 16, 2006

(30) Foreign Application Priority Data

Aug. 11, 2004   (FI)  .................................. 20045289

(51) Int. Cl.
*H02P 7/00* (2006.01)
(52) U.S. Cl. ............................. 290/44; 290/55; 322/37
(58) Field of Classification Search ................. 290/43, 290/44, 54, 55; 415/17; 416/30, 35; 322/37, 322/38, 99
See application file for complete search history.

(56) References Cited

U.S. PATENT DOCUMENTS

| | | | | |
|---|---|---|---|---|
| 4,193,005 A * | 3/1980 | Kos et al. | ...................... | 290/44 |
| 4,333,018 A * | 6/1982 | Bottrell | ........................ | 290/55 |
| 4,435,647 A | 3/1984 | Harner et al. | | |
| 4,461,957 A * | 7/1984 | Jallen | ............................. | 290/44 |
| 4,584,486 A * | 4/1986 | Quynn | ......................... | 290/44 |
| 4,651,017 A * | 3/1987 | Longrigg | ..................... | 290/44 |
| 4,700,081 A * | 10/1987 | Kos et al. | ...................... | 290/44 |
| 4,703,189 A | 10/1987 | DiValentin et al. | | |
| 5,289,041 A * | 2/1994 | Holley | ......................... | 290/44 |
| 5,652,485 A * | 7/1997 | Spiegel et al. | ............... | 318/147 |
| 5,907,192 A * | 5/1999 | Lyons et al. | ................... | 290/44 |
| 6,525,518 B1 | 2/2003 | Garnaes | | |
| 7,042,110 B2 * | 5/2006 | Mikhail et al. | ............... | 290/44 |
| 7,126,236 B2 * | 10/2006 | Harbourt et al. | .............. | 290/44 |
| 2003/0151260 A1 | 8/2003 | Siegfriedsen | | |
| 2006/0066111 A1 * | 3/2006 | Suryanarayanan et al. | .... | 290/44 |

FOREIGN PATENT DOCUMENTS

| | | |
|---|---|---|
| EP | 0 244 341 B1 | 11/1987 |
| EP | 1 432 115 A2 | 6/2004 |

OTHER PUBLICATIONS

European Search Report dated Dec. 27, 2005.

* cited by examiner

*Primary Examiner*—Nicholas Ponomarenko
(74) *Attorney, Agent, or Firm*—Buchanan Ingersoll & Rooney PC

(57) ABSTRACT

A method for preventing mechanical oscillation in a wind power plant includes determining wind speed, controlling a generator of the power plant with speed control when the wind speed is below a predefined limit to maintain the rotation speed of the generator below a predefined first limit, detecting the increase of wind speed above the predefined limit, controlling the electric drive of the wind power plant generator to torque control by using a predefined crossover torque in response to the wind speed increasing above a predefined limit, maintaining the crossover torque as the reference torque for the electric drive until the rotation speed of the generator has increased above a predefined second limit, and controlling the electric drive of the wind power plant generator with torque control while the rotation speed of the generator remains above the predefined second limit.

20 Claims, 4 Drawing Sheets

METHOD IN A WIND POWER PLANT

BACKGROUND OF THE INVENTION

The present invention relates to a method for reducing or even preventing resonance-frequency mechanical oscillations of a wind power plant.

The popularity of wind power plants as sources of renewable energy has in the past few years increased partly due to the fact that the required technology has become less expensive and partly because the energy prices of non-renewable energy sources have increased. At the same time, the unit sizes of wind power plants have been increased, and today the largest working wind power plants are large enough to produce several megawatts of power.

With an increase in nominal electric output, the physical size and mass of the equipment in a wind power plant also increase, which means that the tower supporting the wind turbine, generator, and their peripheral equipment also needs to be strong. In addition, a high-power wind power plant requires a long-blade turbine, in which case the tower also needs to be quite high. The length of the turbine blades in turn directly restricts the rotation speed of the turbine, because the speed of the blade end cannot be allowed to grow arbitrarily already because of the noise it causes.

All the above factors bring about a quite low mechanical resonance frequency of a wind turbine structure. This resonance frequency is typically at a range that it is triggered by the rotation of the turbine. If the turbine rotates for a long time on a frequency that corresponds to the mechanical resonance frequency of the wind turbine structure, there is a danger that the mechanics of the wind power plant can weaken or even fail, thus causing considerable costs. In addition, the noise caused by the resonance situation may disturb the surroundings of the wind power plant.

U.S. Pat. No. 6,525,518 presents a solution with which the start of mechanical resistance of a wind power plant can be detected and the oscillations caused by the resonance reduced. Detecting the resonance is based on a spectrum analysis made on measured quantities. The oscillations are, in turn, reduced by either altering the rotation speed of the rotor or alternatively altering the dynamic load of the turbine. The solutions of U.S. Pat. No. 6,525,518 eliminate resonance situations, but going into resonance is, however, not actively prevented. Thus, the power plant may fall back to the resonance situation. In the solution of U.S. Pat. No. 6,525,518, both alternative ways of reducing the oscillation caused by resonance reduce the power output produced by the wind power plant.

BRIEF DESCRIPTION OF THE INVENTION

It is an object of the invention to develop a method that avoids the above-mentioned drawbacks and enables the reduction of the mechanical oscillations of a wind power plant without significantly affecting the power output of the plant.

The invention is based on the idea that the angular frequency range of the wind turbine producing mechanical resonance is passed as quickly as possible so that the oscillations caused by the resonance are not triggered. At speeds lower than the turbine rotation speed that triggers the resonance frequency, the electric drives of the wind power plant are speed-controlled, and when the wind speed increases to a value that enables the wind turbine to operate above the angular frequency triggering mechanical resonance, torque control is used in the electric drives. Shifting from one control method to another is performed in such a manner that torque control is first set to a small reference value, whereby the wind accelerates the turbine and generator quickly passes the revolution range causing resonance.

The method of the invention provides the advantage that energy output improves even at low rotation speeds in comparison with using torque control. In addition, the method prevents the turbine rotation speed from remaining at the mechanics resonance range, whereby the mechanical service life of the tower becomes longer.

BRIEF DESCRIPTION OF THE FIGURES

The invention will now be described in greater detail by means of preferred embodiments and with reference to FIGS. 1-4, which are a general description of the formation of torque as a function of wind turbine speed.

DETAILED DESCRIPTION OF THE INVENTION

Figure 1:
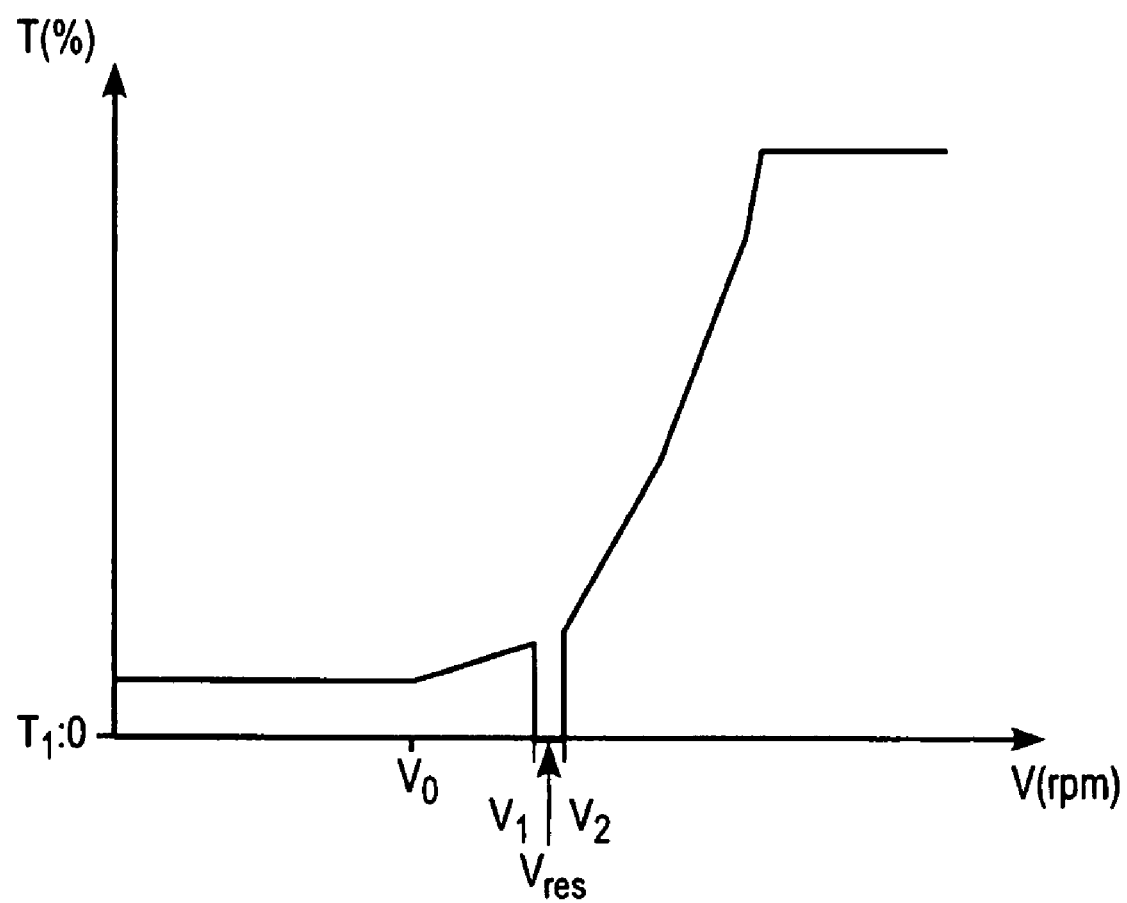

An exemplary method of the invention determines the wind speed at a location that as exactly as possible corresponds to the wind speed at the location of the wind turbine. Such a location for the determination of wind speed may for instance be on the dome enclosing the generator. The determination of the wind speed is typically performed in such a manner that the momentary wind speeds are measured, and an average of the momentary speeds is calculated for a suitable time period. Calculating the average makes it possible to disregard possible momentary gusts, the utilization of which is difficult in energy production.

If, according to the exemplary method, the wind speed is below a predefined limit $w_1$, the generator of the wind power plant is speed-controlled. Speed control refers to a control mode, in which the rotation speed of the generator and wind turbine is kept at a reference value. The size of this reference value may be altered depending on the prevailing wind conditions. Naturally, it is more advantageous to let the turbine rotate faster if the prevailing wind speed permits this. In speed control, it is, however, important to make sure that the generator of the wind power plant produces sufficient torque to maintain the power production at an appropriate level. Thus, speed control can be implemented by altering the reference speed so that the wind turbine generator produces a constant torque, for instance. When utilizing the method of the invention, it is also necessary to make sure that the reference speed is maintained below a predefined limit $v_1$.

According to the method of the invention, wind speed is monitored continuously, and when it is detected that wind speed increases above the predefined limit $w_1$, control action is taken to control the electric drive of the wind power plant generator to torque control, and the torque control is at the same time given a crossoer torque reference value as its reference value.

Thus, when the wind speed increases to a value that permits the operation of the wind turbine at a rotation speed that is above the frequency triggering the resonance of the wind power plant, the above-mentioned control action is taken. This action shifts control to torque control by giving as the reference torque a crossover torque reference value that is a small value and most preferably zero. The torsional moment directed to the turbine shaft by the wind then accelerates the turbine as fast as possible, because the torque of the electric drive is at the crossover torque reference value, which is zero, for instance. In other words, the revolving force directed to the wind turbine axles is used to increase the rotation speed. Because the electric torque is controlled to zero or a small value, the generator momentarily produces no power to the network.

The crossover torque is maintained as the reference torque in the generator until, due to the wind, the rotation speed of the turbine and generator has increased above a predefined second limit $v_2$. When this speed is reached while the wind speed is above the predefined limit $w_1$, the electric drive of the wind power plant generator is torque-controlled. Torque-control achieves in a manner known per se good control possibilities for the power produced with the generator and also a good power production capability. Typically, the reference torque for the electric drive is formed as a function of the generator rotation speed. It should be noted that the rotation speeds of the generator and wind turbine do not necessarily correspond, since many drives use a gear between the wind turbine and generator.

Figure 2:
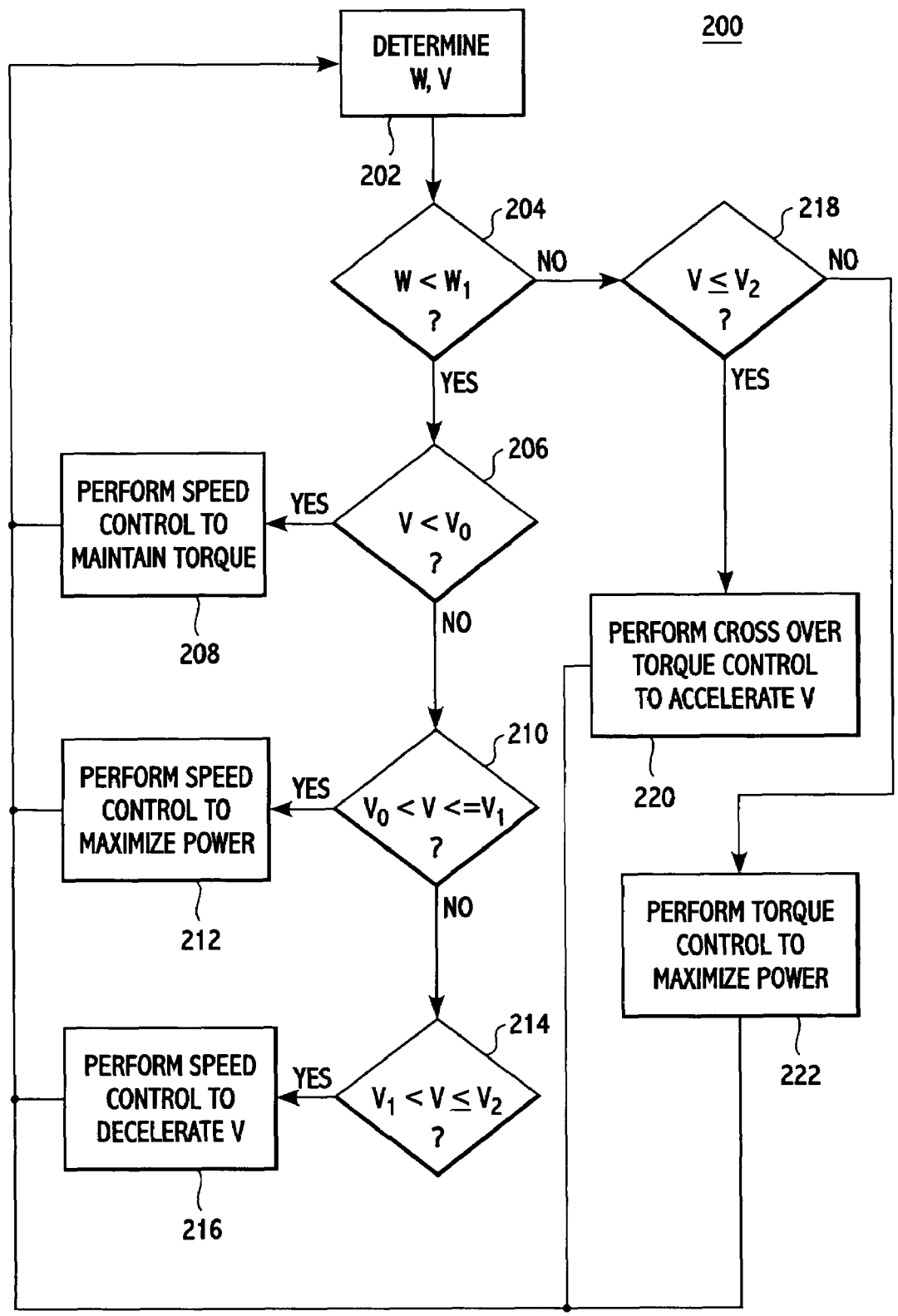

FIG. 1 is a graphical presentation of an electric torque descriptor of the invention as a function of the rotation speed of the generator and FIG. 2 illustrates a flow chart of the exemplary method. Let us first imagine a situation, in which the wind speed is below the predefined limit $W_1$. The rotation speed of the wind turbine and generator is then within the range of 0 to $V_1$ rpm, and the generator is speed-controlled as described above. (See steps 204-216 in FIG. 2) As the wind speed increases, the reference speed is altered to keep the electric torque substantially constant as shown in FIG. 1. (Steps 206-208) When the rotation speed has reached the limit value $V_0$, the torque produced by the generator is slowly increased as the wind force and the rotation speed increase. (Steps 210-212) At this stage, the torque is increased to limit the rotation speed and to increase power production.

When the wind speed further increases above the predefined limit $w_1$, torque control mode is initiated, and crossover torque reference $T_1$, i.e. zero, for instance, is set as the reference torque. (Steps 218-220) The generator and wind turbine then accelerate rapidly, because before shifting to torque control, the torque that slows acceleration was already increased. Now that this torque slowing acceleration is removed, the rotation speed quickly changes to a range that does not trigger the mechanical resonance of the wind power plant. The zero torque reference can be removed when the rotation speed has increased above the second predefined limit $V_2$. (Step 222) In FIG. 1, the rotation speed $v_{res}$ triggering mechanical resonance is shown in a rotation speed range limited by the predefined limits $V_1$ and $V_2$. It should be noted that the range between these limits may be great or small depending on the case. In some cases, the limits $V_1$, $V_2$ can also be set to the rotation speed $V_{res}$ that triggers the resonance, or to some other common rotation speed.

When the wind speed decreases so that it is necessary to shift from torque control mode to speed control mode, the shift can be done without a small crossover reference torque. The shift can for instance be done in such a manner that as the rotation speed of the wind turbine reaches the predefined second limit $V_2$, speed control mode is initiated directly, and the speed controller is given a reference value that is smaller than the speed triggering the resonance frequency. (Steps 214-216) his also makes it possible to momentarily increase the electric torque, i.e. the produced power, whereby the generator and turbine decelerate rapidly.

Figure 3:
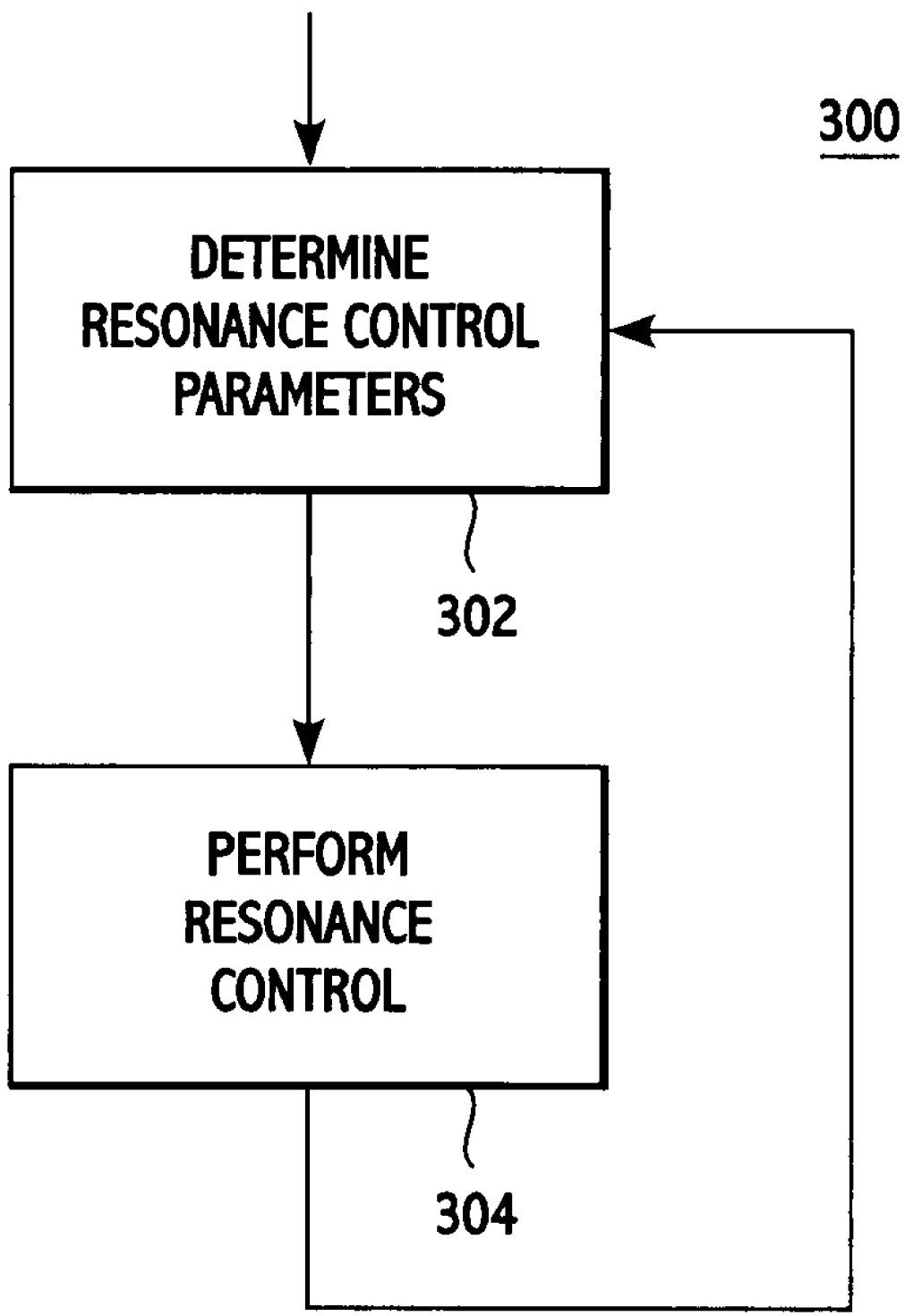
Figure 4:
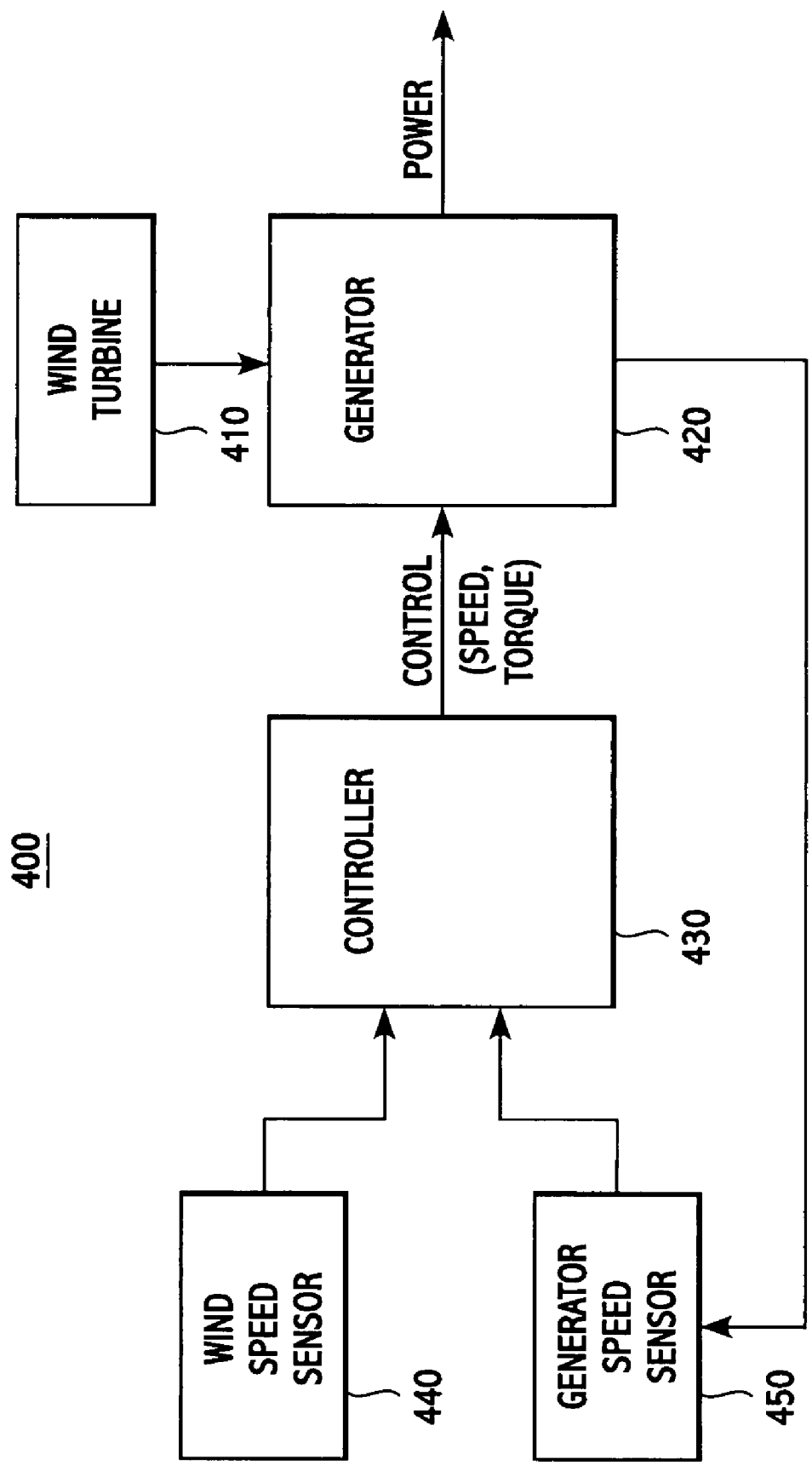

The rotation speed triggering the resonance can for instance be defined during the trial run of the wind power plant by using a known method. After this definition, the required parameters can simply be set for the control system. It is also clear that the rotation speed triggering the resonance can be defined during use, in which case the equipment provides the required parameters for the control system. Likewise, it is clear that the same method can be applied to several resonance points, if the wind power plant structure has several resonance frequencies. (See FIG. 3.)

The method of the invention can be applied to many wind power plants of different type. The essential thing is that the wind power plant generator can be controlled to apply a reference speed and reference torque as described in the claims.

It is apparent to a person skilled in the art that as the technology advances, the basic idea of the invention can be implemented in many different ways. Thus, the invention and its embodiments are not limited to the examples described above, but may vary within the scope of the claims.

The invention claimed is:

1. A method for reducing mechanical oscillation in a wind power plant, the method comprising:
   determining a wind speed;
   controlling a generator of the power plant with a speed control when the wind speed is below a predefined wind speed limit to maintain a rotation speed of the generator below a predefined first rotation speed limit;
   detecting an increase of the wind speed above the predefined wind speed limit;
   controlling a torque of the generator with torque control by using a predefined crossover torque in response to the wind speed increasing above the predefined wind speed limit;
   maintaining the torque control to control the torque of the generator using the predefined crossover torque until the rotation speed of the generator has increased above a predefined second rotation speed limit; and
   controlling the generator with torque control while the rotation speed of the generator remains above the predefined second rotation speed limit.

2. The method as claimed in claim 1, wherein a value of the predefined crossover torque is zero.

3. The method as claimed in claim 1, wherein the determining of the wind speed comprises:
   measuring multiple momentary wind speeds over a predetermined time period;
   calculating an average of the multiple momentary wind speeds.

4. The method as claimed in claim 1, wherein the controlling of the generator with the speed control comprises producing a reference speed for a speed control circuit in such a manner that the torque to be produced is essentially constant.

5. The method as claimed in claim 1, wherein the controlling of the generator with the speed control further comprises:
   detecting an increase of the rotation speed of the generator speed above a predefined limit speed; and
   increasing a value size of the torque produced by the generator in response to the rotation speed of the generator increasing above the predefined limit speed.

6. The method as claimed in claim 1, comprising:
   defining in advance the rotation speed of the generator that triggers the mechanical oscillation of the wind power plant, selecting the predefined first rotation speed limit to be smaller than the rotation speed of the generator that triggers the mechanical oscillation of the wind power plant, and selecting the predefined second rotation speed limit to be greater than the rotation speed of the generator that triggers the mechanical oscillation of the wind power plant.

7. A method for controlling a wind turbine of a wind power plant, comprising:
   (a) determining whether a wind speed is above a wind speed limit;
   (b) determining whether a rotational speed of the wind turbine is above an upper range limit when it is determined in step (a) that the wind speed is above the speed limit, wherein the upper range limit is substantially an upper limit of a range of the rotational speed of the wind turbine that causes a resonance frequency mechanical oscillation of the wind turbine; and
   (c) controlling a torque of a generator so that a crossover torque is applied to the generator to increase the rotational speed of the wind turbine when it is determined in step (b) that the rotational speed of the wind turbine is not above the upper range limit,
   wherein the wind turbine is connected to the generator such that a rotation of the wind turbine rotates the generator to overcome the torque of the generator to produce power.

8. The method of claim 7, wherein a value of the crossover torque is substantially zero.

9. The method of claim 7, comprising:
   (d) controlling the torque of the generator to generate power when it is determined in step (b) that the rotational speed of the wind turbine is above the upper range limit.

10. The method of claim 7, comprising:
    (e) determining whether the rotational speed of the wind turbine is below a lower range limit when it is determined in step (a) that the wind speed is not above the speed limit, wherein the lower range limit is substantially a lower limit of the range of the rotational speed of the wind turbine that causes the resonance frequency mechanical oscillation of the wind turbine; and
    (f) controlling the generator to decrease the rotational speed of the wind turbine when it is determined in step (e) that the rotational speed of the wind turbine is not below the lower range limit.

11. The method of claim 10, wherein the step (f) comprises:
    controlling the generator to increase the torque of the generator to decrease the rotational speed of the wind turbine.

12. The method of claim 10, further comprising:
    (g) controlling the generator to maintain the torque of the generator to a predetermine torque value when it is determined in step (e) that the rotational speed of the wind turbine is below the lower range limit.

13. The method of claim 10, comprising:
    (h) determining the wind speed limit, the lower range speed limit, and the upper range limit prior to performing step (a).

14. The method of claim 13, comprising:
    (h) updating the wind speed, the low lower range limit, and the upper range limit during, or in between, performing any of the steps (a), (b) and (c).

15. A method to protect a wind power plant, wherein the wind power plant includes a wind turbine and a generator connected to the wind turbine for generating power when the wind turbine rotates, comprising:
    (a) determining whether $W<=W_1$ is substantially true, wherein W is a wind speed and $W_1$ is a wind speed limit;
    (b) determining whether $V<=V_0$ is substantially true when it is determined that $W<=W_1$ is substantially true in step (a), wherein V is a rotational speed of the wind turbine and $V_0$ is a first rotational speed limit;
    (c) controlling a rotational speed of the generator such that $T=T_0$ is substantially true when it is determined that $V<=V_0$ is substantially true in step (b), wherein T is a torque of the generator to be overcome by a rotation of the wind turbine to rotate the generator and wherein $T_0$ is a predefined torque value;
    (d) determining whether $V_1<=V<=V_2$ is substantially true when it is determined that $W<=W_1$ is substantially not true in step (a), wherein $V_1$ and $V_2$ are respectively lower and upper limits of the rotational speed of the wind turbine that causes an unacceptable mechanical oscillation of the wind turbine; and
    (e) controlling T of the generator to increase V such that $V>V_2$ becomes substantially true when it is determined that $V_1<=V<=V_2$ is substantially true in step (d).

16. The method of claim 15, wherein $T_0$ is a non-zero torque value.

17. The method of claim 15, wherein the step (e) comprises:
    controlling T of the generator such that $T=0$ is substantially true.

18. The method of claim 15, comprising:
    (f) determining whether $V>V_2$ is substantially true when it is determined that $W<=W_1$ is substantially not true in step (a); and
    (g) controlling T of the generator to generate power when it is determined that $V>V_2$ is substantially true in step (f).

19. The method of claim 15, comprising:
    (h) determining whether $V_1<=V<=V_2$ is substantially true when it is determined that $W<=W_1$ is substantially true in step (a); and
    (i) increasing T of the generator to decrease V such that $V<V_1$ becomes substantially true when it is determined that $V_1<=V<=V_2$ is substantially true in step (h).

20. The method of claim 15, comprising:
    (j) determining whether $V_0<=V<V_1$ is substantially true when it is determined that $W<=W_1$ is substantially true in step (a); and
    (k) controlling T of the generator to generate power when it is determined that $V_0<=V<V_1$ is substantially true in step (j).

* * * * *